(12) United States Patent
Nishino et al.

(10) Patent No.: US 7,421,917 B2
(45) Date of Patent: Sep. 9, 2008

(54) TRACTOR WITH A PTO APPARATUS

(75) Inventors: Akifumi Nishino, Sakai (JP); Ryuji Kitagawa, Sakai (JP); Kiyokazu Nakanishi, Kawachinagano (JP); Tsukasa Wada, Sakai (JP); Kenzo Ushiro, Sakai (JP)

(73) Assignee: Kubota Corporation, Osaka (JP)

( * ) Notice: Subject to any disclaimer, the term of this patent is extended or adjusted under 35 U.S.C. 154(b) by 624 days.

(21) Appl. No.: 11/165,845

(22) Filed: Jun. 24, 2005

(65) Prior Publication Data
US 2006/0150757 A1 Jul. 13, 2006

(30) Foreign Application Priority Data
Jun. 25, 2004 (JP) ............................ 2004-188316
Oct. 14, 2004 (JP) ............................ 2004-300336

(51) Int. Cl.
*F16H 37/00* (2006.01)

(52) U.S. Cl. .......................... 74/11; 74/15.4; 74/15.82; 74/473.21

(58) Field of Classification Search ............... 74/11, 74/15.4, 15.69, 15.82, 15.86, 473.1, 473.21, 74/473.24
See application file for complete search history.

(56) References Cited

U.S. PATENT DOCUMENTS 3,763,976 A * 10/1973 Prokop et al. ............... 192/3.63
4,398,433 A * 8/1983 Sonns ....................... 74/473.21
4,517,856 A * 5/1985 Schafer et al. ................ 74/528
5,085,095 A * 2/1992 Lasoen ....................... 74/473.3
5,145,469 A * 9/1992 Lasoen ........................ 475/209

FOREIGN PATENT DOCUMENTS

| JP | 56-153151 | 11/1981 |
| JP | 56-160222 | 12/1981 |
| JP | 61-031742 | 2/1986 |
| JP | 05-162551 | 6/1993 |
| JP | 05-246258 | 9/1993 |
| JP | 07-205673 | 8/1995 |

* cited by examiner

*Primary Examiner*—David M Fenstermacher
(74) *Attorney, Agent, or Firm*—The Webb Law Firm

(57) ABSTRACT

A tractor with a PTO apparatus, comprises: a plurality of wheels; a vehicle body supported by the plurality of wheels; an engine supported on the vehicle body; a rear PTO shaft disposed at a rear of the vehicle body for transmitting power from the engine; a mid-PTO shaft disposed under the vehicle body for transmitting power from the engine; a PTO mode selecting device having a first position for transmitting power only to the rear PTO shaft, a second position for transmitting power to both the rear PTO shaft and said mid-PTO shaft, and a third position for transmitting power only to said mid-PTO shaft; a PTO clutch disposed on a transmission line upstream of said PTO mode selecting device and switchable between an engaged position and a disengaged position; and a restricting mechanism for preventing a change operation of said PTO mode selecting device when said PTO clutch is in the engaged position, and permitting the change operation of said PTO mode selecting device when said PTO clutch is in the disengaged position.

12 Claims, 18 Drawing Sheets

(Standard 4WD mode)

Fig.6 (Front Wheel Increased Speed Mode)

(Rear PTO···ON, Mid PTO···ON)

(Rear PTO···ON, Mid PTO···OFF)

(Rear PTO...OFF  Mid PTO...ON)

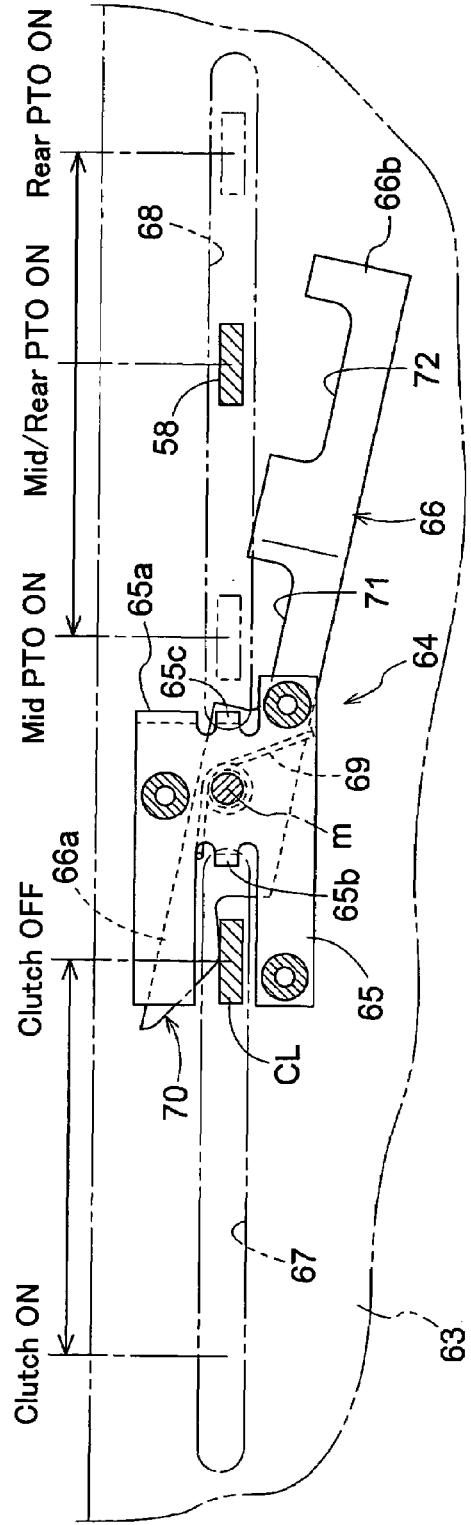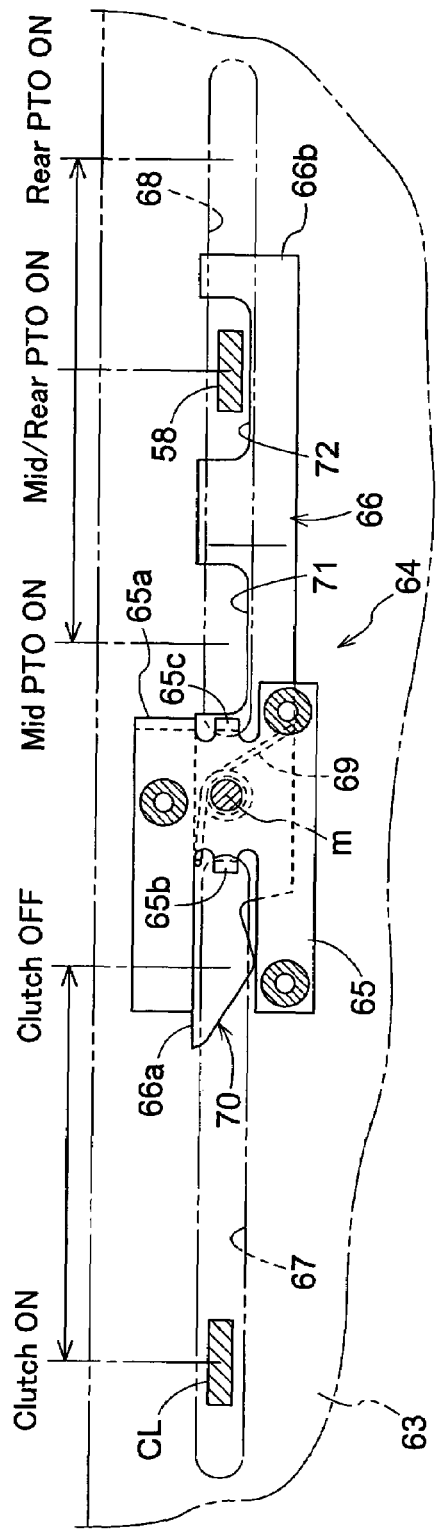

TRACTOR WITH A PTO APPARATUS

BACKGROUND OF THE INVENTION

This invention relates to a tractor with a PTO apparatus having a rear PTO shaft disposed at the rear of a vehicle body and a mid-PTO shaft disposed under the vehicle body.

A known tractor includes a rear PTO shaft disposed at the rear of a vehicle body, a mid-PTO shaft disposed under the vehicle body, and a PTO mode selecting mechanism for selecting an output state from three output states. The three output states are a state of outputting power only from the rear PTO shaft, a state of outputting power from both the rear PTO shaft and mid-PTO shaft, and a state of outputting power only from the mid-PTO shaft. The tractor further includes a PTO clutch disposed on a power transmission line upstream of the PTO mode selecting mechanism (see Japanese Application "Kokai" No. 5-162551, FIG. 7, for example).

The above PTO transmission structure has excellent practical utility for enabling a wide range of operations using the rear PTO shaft and mid-PTO shaft. However, the PTO mode selecting mechanism could be operated inadvertently without disengaging the PTO clutch, thereby abruptly rotating the PTO shafts from stationary state, or abruptly stopping the PTO shafts in rotation. In this way, an excessive force may be applied to meshed gears or splines on the PTO transmission line to damage such components or produce a loud noise.

SUMMARY OF THE INVENTION

The object of this invention is to solve the above-noted problems. A tractor with a PTO apparatus comprises: a plurality of wheels; a vehicle body supported by said plurality of wheels; an engine supported on said vehicle body; a rear PTO shaft disposed at a rear of said vehicle body for transmitting power from said engine; a mid-PTO shaft disposed under said vehicle body for transmitting power from said engine; a PTO mode selecting device having a first position for transmitting power only to said rear PTO shaft, a second position for transmitting power to both said rear PTO shaft and said mid-PTO shaft, and a third position for transmitting power only to said mid-PTO shaft; a PTO clutch disposed on a transmission line upstream of said PTO mode selecting device and switchable between an engaged position and a disengaged position; and a restricting mechanism for preventing a change operation of said PTO mode selecting device when said PTO clutch is in the engaged position, and permitting the change operation of said PTO mode selecting device when said PTO clutch is in the disengaged position.

According to the above construction, the PTO mode selecting device is switchable only when the PTO clutch disposed on the transmission line upstream of the PTO mode selecting device is in the disengaged position. This feature precludes the possibility of abruptly rotating the PTO shafts from stationary state or abruptly stopping the PTO shafts in rotation.

Thus, the apparatus according to this invention contributes to improvement in the durability and operability of the PTO transmission system.

The disclosures of Japanese Patent Applications 2004-300336 filed on Oct. 14, 2004 and 2004-188316 filed on Jun. 24, 2004 are incorporated by reference.

BRIEF DESCRIPTION OF THE DRAWINGS

FIG. 19 is a plan view showing the lever guide of the PTO system according to this invention.

DETAILED DESCRIPTION OF THE PREFERRED EMBODIMENTS

Preferred embodiments of this invention will be described hereinafter with reference to the drawings.

Figure 1:
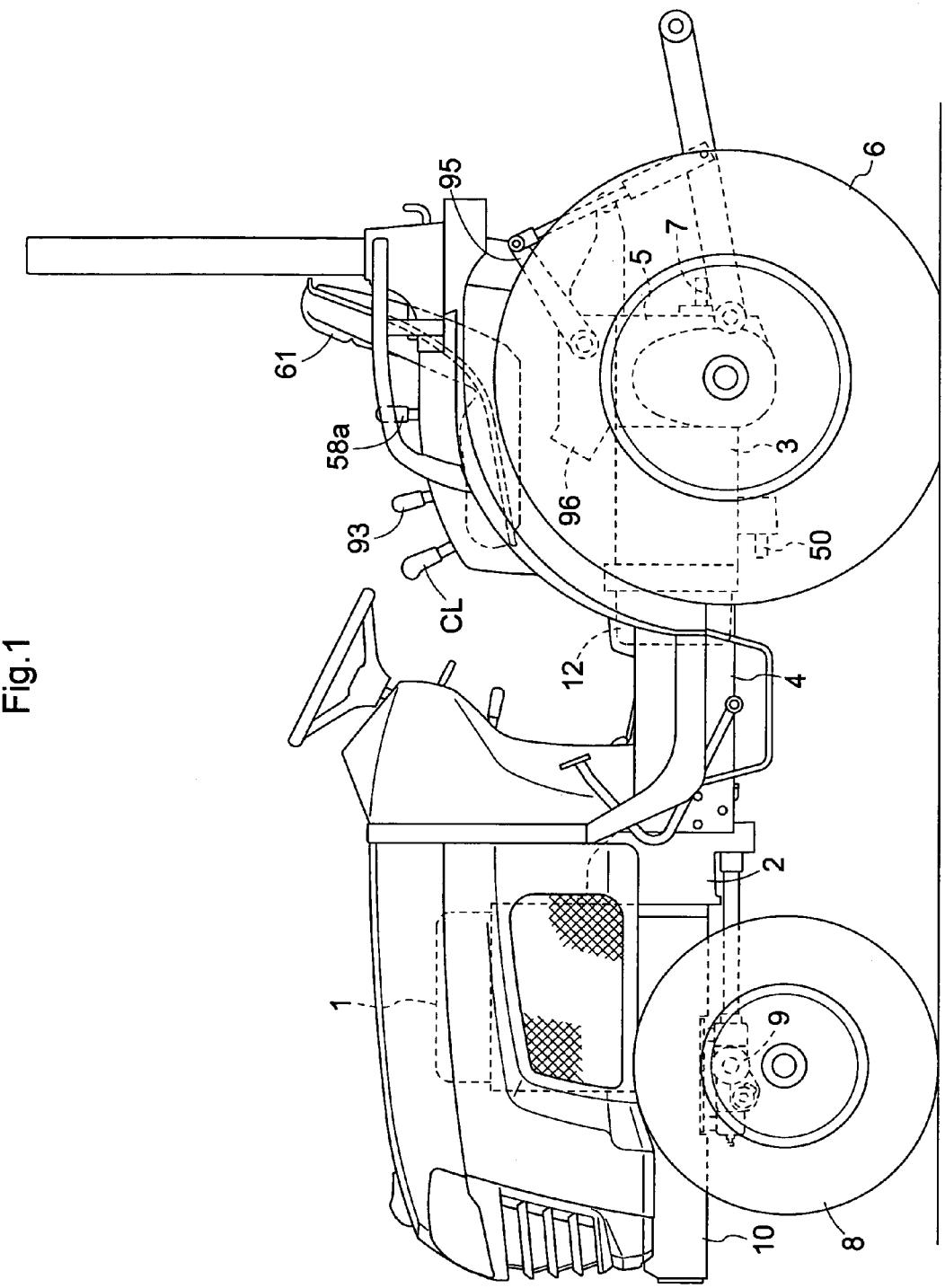
FIG. 1 is a side elevation of a tractor.

FIG. 1 shows a side elevation of a tractor according to this invention. The tractor includes a clutch housing 2 directly connected to the back of an engine 1, a housing frame 4 of sheet metal structure, a main transmission 12 in the form of a hydrostatic stepless transmission (HST), a transmission case 3 and a differential case 5. These components are successively connected in tandem to constitute a vehicle body. The differential case 5 rotatably supports right and left rear wheels 6, and has a rear PTO shaft 7 projecting rearward. Right and left front wheels 8 are dirigibly supported by a front axle case 9 attached for rolling motion to a lower position of a front frame 10 connected to the engine 1.

Figure 2:
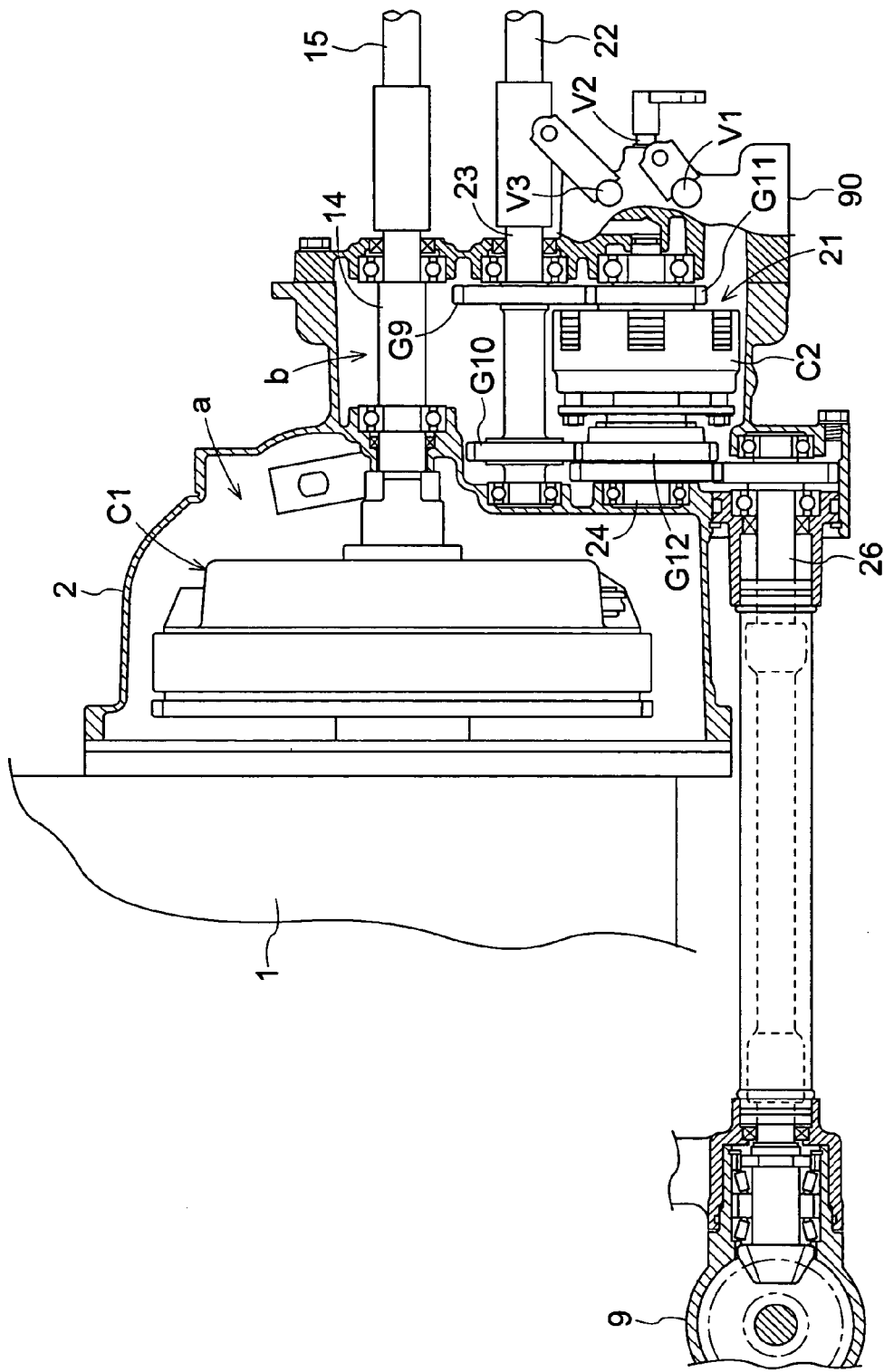
FIG. 2 is a side view in vertical section of a front wheel transmission structure.
Figure 3:
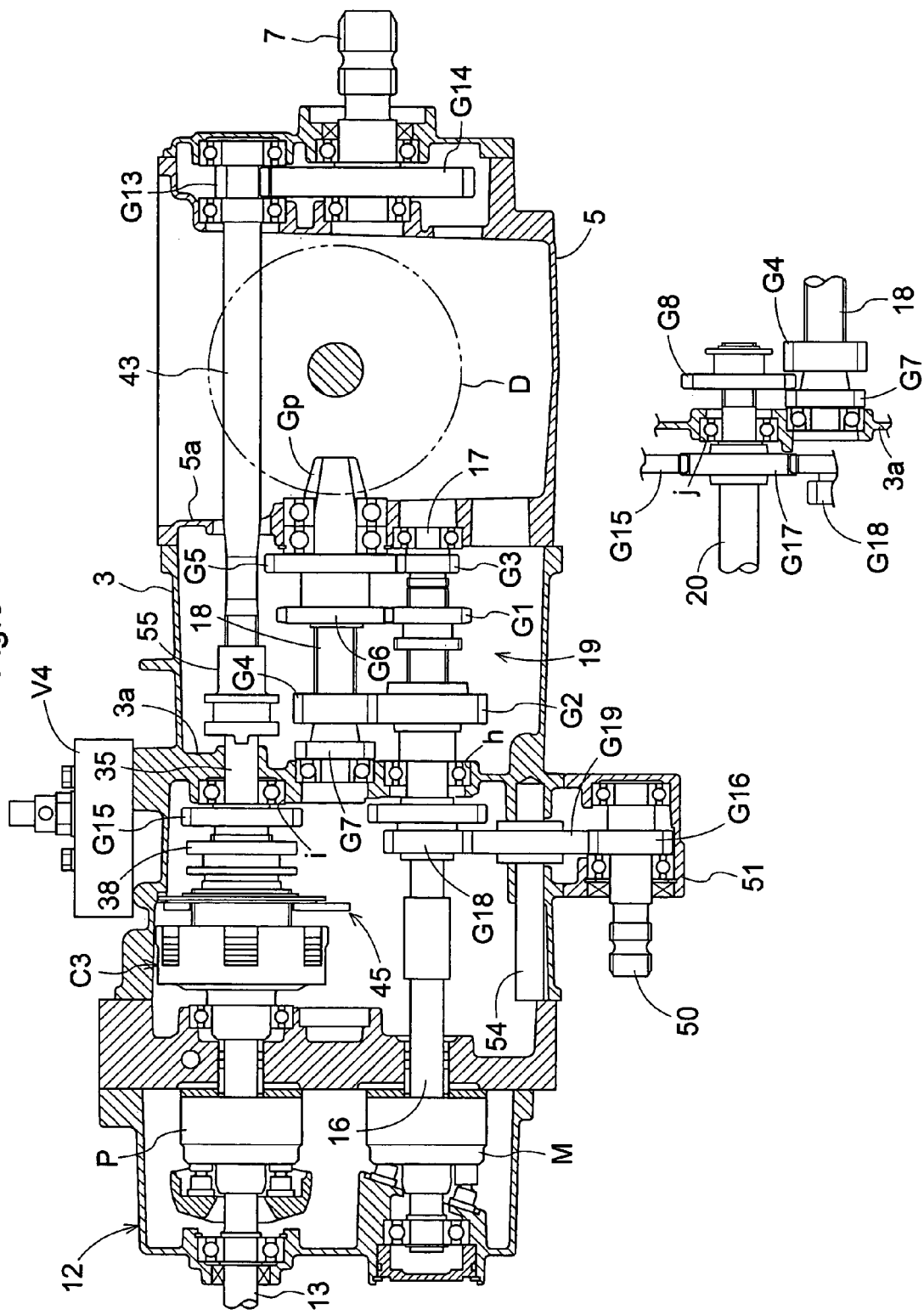
FIG. 3 is a side view in vertical section of a transmission structure.
Figure 4:
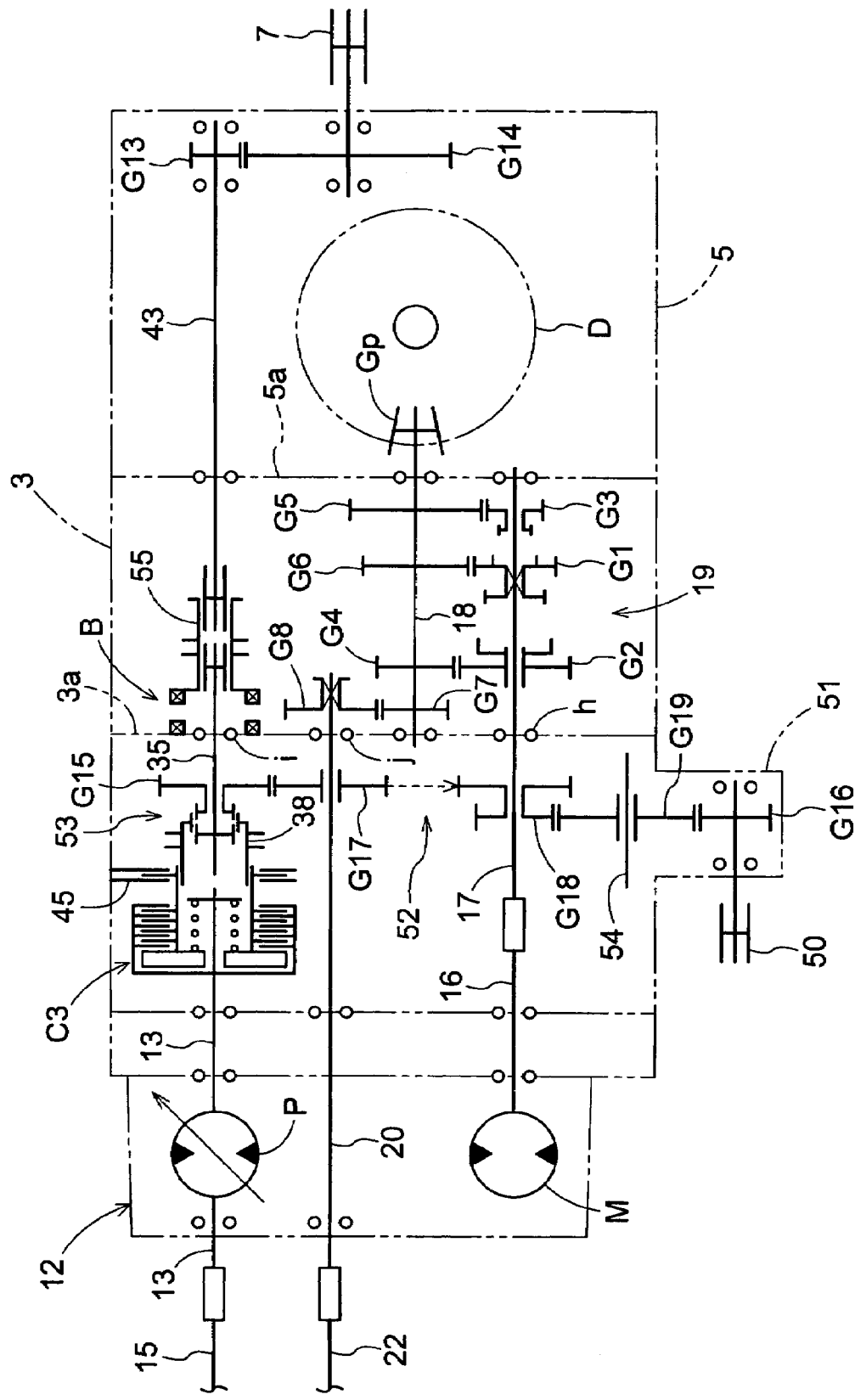
FIG. 4 is a schematic view showing gear trains of the transmission structure.

Next, the structure of a transmission system of this tractor will be described. As shown in FIG. 2, the clutch housing 2 has a main clutch C1 of the single plate, dry type mounted in an upper portion thereof. As shown in FIG. 3, the main transmission 12 includes, arranged in upper and lower positions thereof, a variable displacement pump P of the axial plunger type and a fixed displacement motor M of the axial plunger type. A main output shaft 14 projecting rearward from the clutch housing 2 is interlocked, through a main transmission shaft 15, to an input shaft 13 projecting forward from the upper position of the main transmission 12.

A well-known structure is employed for the main transmission 12 for driving an output shaft 16 of the motor M at steplessly variable speeds forward or backward by varying a swash plate angle of the pump P to change the amount and direction of pressure oil discharge. Thus, the main transmission 12 is operable by a change pedal, not shown, disposed in a right-hand position on a driving platform, to effect stepless speed changing and backward and forward switching from a zero speed start.

The transmission case 3 is open at the front and rear ends, and has an intermediate partition wall 3a located in a fore and aft intermediate position thereof to divide its interior into a front portion and a rear portion. A transmission shaft 17 of the propelling system supported by the intermediate partition wall 3a and a front wall 5a of the differential case 5 is coaxially coupled to the output shaft 16 of the motor M. In the rear portion of the transmission case 3, a bevel pinion shaft 18 acting as a final transmission shaft is supported by the intermediate partition wall 3a and the front wall 5a of the differential case 5. An auxiliary change speed gear mechanism 19 of the propelling system is mounted between the transmission shaft 17 and the bevel pinion shaft 18. The auxiliary change speed gear mechanism 19 has a shift gear G1 splined to the transmission shaft 17 to be shiftable to rotate the bevel pinion shafts 18 at three speeds. Thus, the right and left rear wheels 6 are driven at variable speeds through a differential mechanism D meshed with a bevel pinion gear Gp.

Specifically, the transmission shaft 17 has a large diameter loose fit gear G2 mounted on a forward part thereof, and a small diameter loose fit gear G3 mounted on a rearward part thereof. The bevel pinion shaft 18 has a small diameter gear G4 fixed thereto and in constant mesh with the large diameter loose fit gear G2, and a large diameter gear G5 fixed thereto and in constant mesh with the small diameter loose fit gear G3. The bevel pinion shaft 18 further includes an intermediate diameter gear G6 fixed thereto to be meshable directly with the shift gear G1. When the shift gear G1 is shifted rearward to couple a boss portion thereof to a boss portion of the small diameter loose fit gear G3, a "low speed" is provided by the gear ratio between the small diameter loose fit gear G3 and large diameter gear G5. When the shift gear G1 is shifted to a fore and aft intermediate position to mesh directly with the intermediate gear G6, an "intermediate speed" is provided by the gear ratio between the shift gear G1 and intermediate gear G6. When the shift gear G1 is shifted forward to couple a boss portion thereof to a boss portion of the large diameter loose fit gear G2, a "high speed" is provided by the gear ratio between the large diameter loose fit gear G2 and small diameter gear G4.

As described above, the bevel pinion shaft 18 is hydraulically and steplessly changed to different forward or backward speeds, and changed to three speeds by the auxiliary change speed gear mechanism 19. The bevel pinion shaft 18 has an output gear G7 fixed to a forward end thereof for power transmission to the front wheels 8. Further, a front wheel driving transmission shaft 20 extends through, and is supported by, the intermediate partition wall 3a and the main transmission 12. The front wheel driving transmission shaft 20 has a shift gear G8 splined to a rear end region thereof. This shift gear G8 is shiftable forward into mesh with the output gear G7 on the bevel pinion shaft 18. This provides a four wheel drive state in which power for front wheel drive is taken from the front wheel driving transmission shaft 20 at a speed synchronized with a rear wheel driving speed. When the shift gear G8 is shifted rearward to disengage from the output gear G7, the front wheels 8 are no longer driven and a rear, two wheel driving state is provided to drive only the rear wheels 6.

On the other hand, as shown in FIG. 2, the clutch housing 2 includes a dry type clutch chamber "a" for accommodating the main clutch C1, and a wet type (oil bath lubrication type) change speed chamber "b" isolated from the chamber "a".

The change speed chamber "b" houses a front wheel change speed mechanism 21 for receiving the front wheel driving power taken forward from the front wheel driving transmission shaft 20. The front wheel change speed mechanism 21 includes an input shaft 23 coaxially coupled to the front wheel driving transmission shaft 20 through an intermediate shaft 22, and a transmission shaft 24 extending parallel to the input shaft 23. The transmission shaft 24 has a shift clutch C2 mounted thereon and operable to rotate the transmission shaft 24 at two, high and low speeds. The power is then transmitted through gears to a front wheel drive shaft 26 disposed at a lower end of the clutch housing 2. The power taken forward from the front wheel drive shaft 26 at the two, high and low speeds is transmitted to the front axle case 9.

Figure 5:
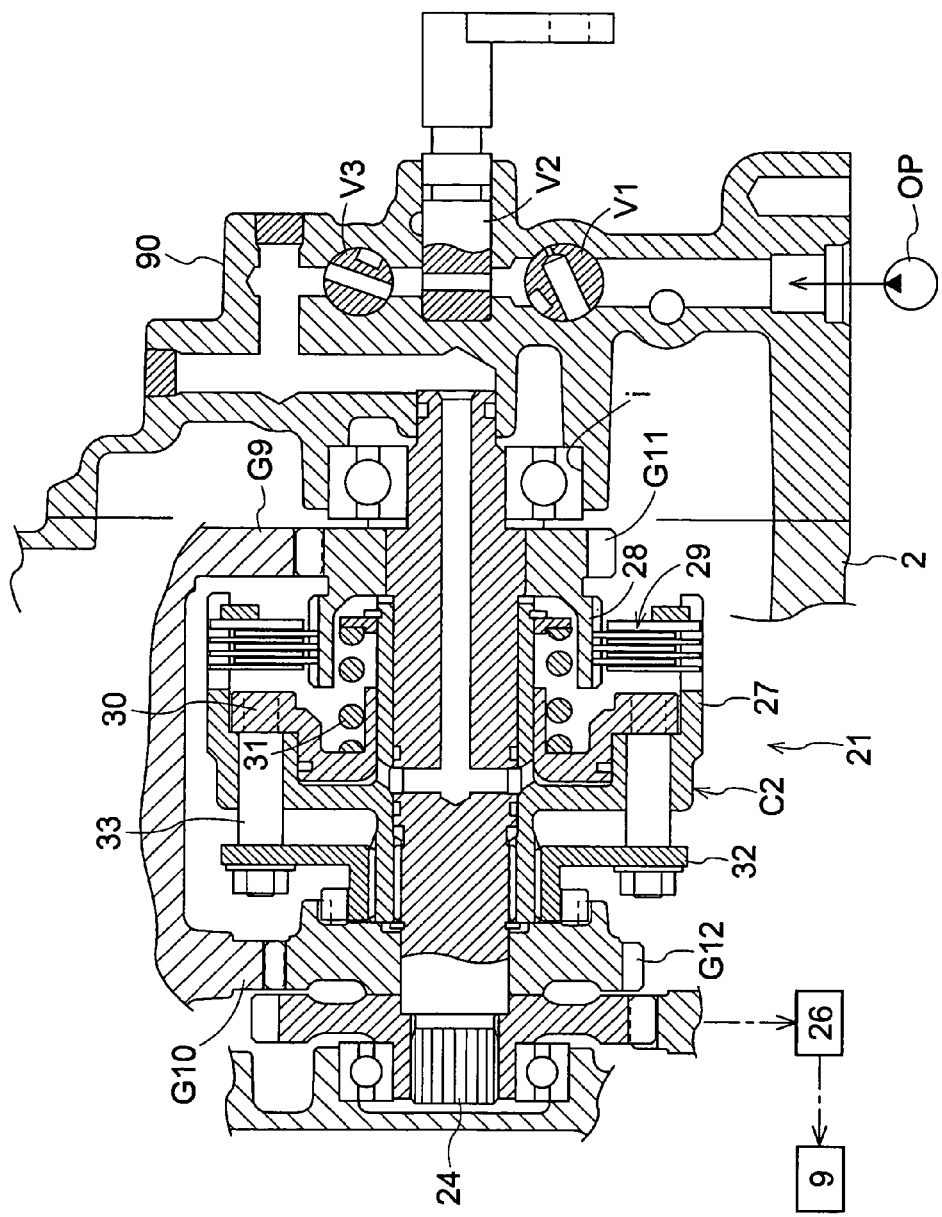
FIG. 5 is a side view in vertical section of a front wheel change speed mechanism in a standard four wheel drive mode.

The input shaft 23 has a large diameter gear G9 and a small diameter gear G10. The transmission shaft 24 has a small diameter idle gear G11 and a large diameter idle gear G12 in constant mesh with these gears G9 and G10. The shift clutch C2 mounted on the transmission shaft 24, as shown in FIG. 5, includes a frictional transmission portion 29 of the multi-disk type disposed between a clutch drum 27 fixed to the transmission shaft 24 and a splined boss 28 formed integral with the small diameter idle gear G11. The clutch drum 27 contains a piston member 30 displaceable by pressure oil supplied and drained through an oil passage formed in the transmission shaft 24 and by a spring 31 mounted in the clutch drum 27, thereby placing the friction transmission portion 29 in a pressure contact state and canceling the pressure contact state to engage and disengage the clutch C2.

A shift member 32 is shiftably mounted on a boss portion of the clutch drum 27, and rigidly connected to the piston member 30 through connecting pins 33 penetrating the clutch drum 27. Thus, the shift member 32 is shifted with movement of the piston member 30. When the pressure oil supply is stopped, as shown in FIG. 5, the piston member 30 is displaced leftward in the figure by the inner spring 31, to place the shift clutch C2 in "off" state. At the same time, the shift member 32 connected to the piston member 30 meshes with a side of the large diameter idle gear G12. Power is transmitted from the input shaft 23 to the transmission shaft 24 at reduced speed through the small diameter gear G10, large diameter idle gear G12, shift member 32 and clutch drum 27. Then, the power is taken from the forward end of the transmission shaft 24, and transmitted to the front axle case 9 through the front wheel driving shaft 26. In this case, the front wheels 8 are driven at a peripheral velocity equivalent to (or slightly faster than) a rear wheel peripheral velocity, thereby to provide a standard four wheel drive mode.

Figure 6:
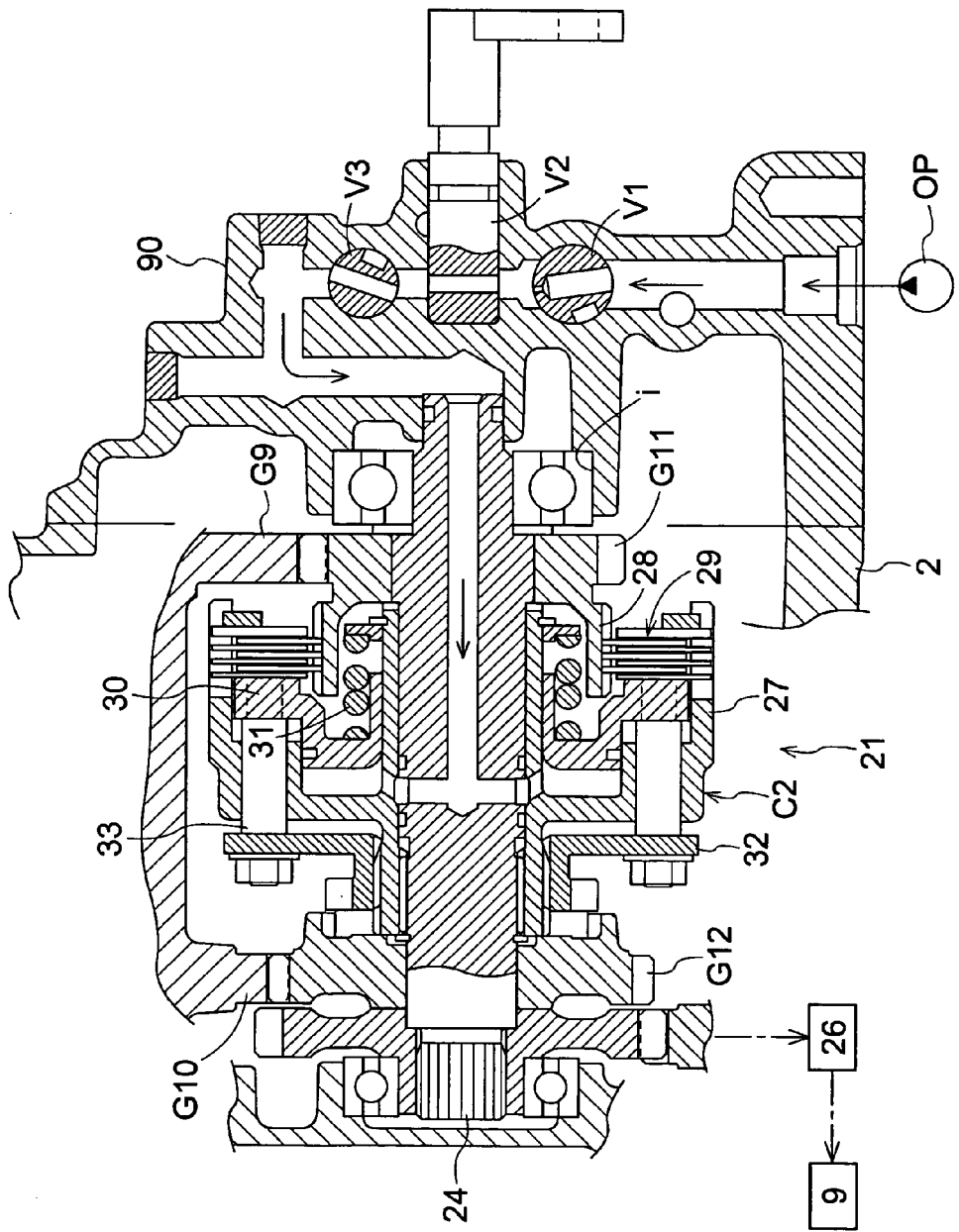
FIG. 6 is a side view in vertical section of the front wheel change speed mechanism in a front wheel accelerating drive mode.

When pressure oil is supplied, as shown in FIG. 6, the piston member 30 is moved against the force of inner spring 31, rightward in the figure, to place the friction transmission portion 29 in the pressure contact state, and thus to place the shift clutch C2 in "on" state. At the same time, the shift member 32 connected to the piston member 30 is moved out of mesh with the large diameter idle gear G12. Power is transmitted from the input shaft 23 to the transmission shaft 24 at increased speed through the large diameter gear G9, small diameter idle gear G11, friction transmission portion 29 and clutch drum 27. Then, the power is transmitted to the front axle case 9 through the front wheel driving shaft 26. In this case, the front wheels 8 are driven at about twice the rear wheel peripheral velocity, thereby to provide a front wheel accelerating drive mode.

Figure 7:
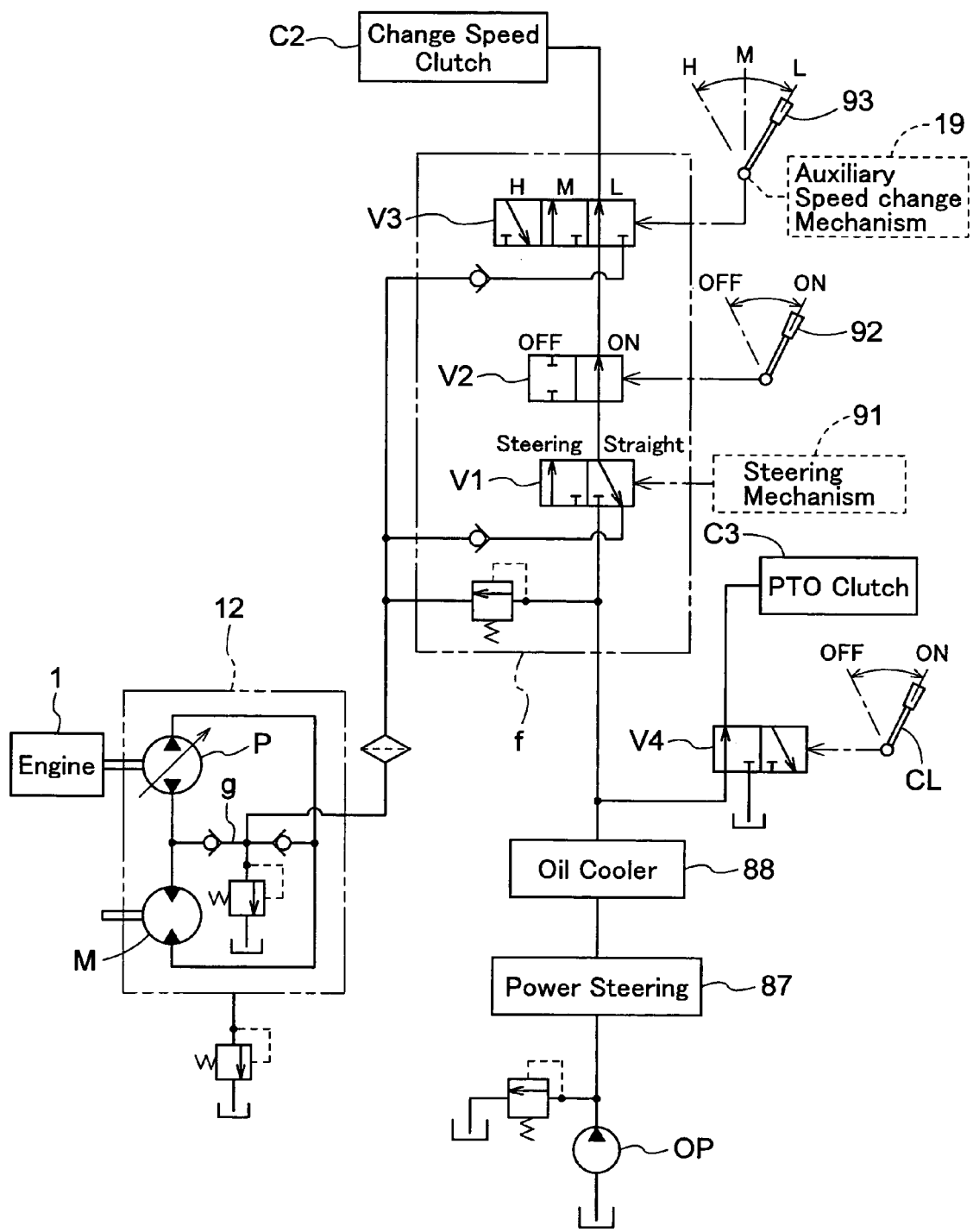
FIG. 7 is a hydraulic circuit diagram.

As shown in the hydraulic circuit diagram of FIG. 7, the pressure oil supplying and draining passage for the shift clutch C2 has, arranged in series, a front wheel control valve V1 switchable as interlocked with steering of the front wheels 8, an automatic change speed selector valve V2 for turning on and off an automatic change speed of the front wheels 8, and a check valve V3 switchable as interlocked with shifting of the auxiliary change speed gear mechanism 19. A hydraulic pump OP driven by the engine 1 delivers pressure oil through a power steering unit 87 and an oil cooler 88 to a hydraulic circuit "f" for front wheel change speed, Return oil from the hydraulic circuit "f" for front wheel change speed is supplied to a charge circuit "g" for the hydrostatic stepless transmission 12.

As shown in FIGS. 6 and 7, the front wheel control valve V1, automatic change speed selector valve V2 and check valve V3 are in the form of rotary valves, respectively, These valves V1, V2, and V3 are assembled to a single valve casing 90 connected to the rear of clutch housing 2. While the front wheel control valve V1 and check valve V3 are arranged in parallel, the automatic change speed selector valve V2 located between the valves V1 and V3 has a spool axis extending perpendicular to the spool axes of the other valves V1 and V3.

The front wheel control valve V1 is mechanically interlocked to a steering mechanism 91 of the front wheels 8. When the front wheels 8 are in a straight running state, the control valve V1 shuts the oil passage. When the front wheels 8 are steered in excess of a predetermined angle (e.g. 35 degrees) left or right from the straight running state, the front wheel control valve V1 is turned to open the oil passage. The automatic change speed selector valve V2 is linked to a change lever 92, to open the oil passage when the change lever 92 is in an automatic change speed "on" position, and shut the oil passage when the change lever 92 is in an automatic change speed "off" position. The check valve V3 is linked to an auxiliary shift lever 93 for switching the auxiliary change speed gear mechanism 19 which provides three propelling speeds. The oil passage is opened when the auxiliary change speed gear mechanism 19 is shifted for the "low speed" or "intermediate speed". The oil passage is shut when the auxiliary change speed gear mechanism 19 is shifted for the "high speed".

Thus, only when the automatic change speed "on" position is selected for the automatic change speed selector valve V2 to open the oil passage, and the auxiliary change speed gear mechanism 19 is shifted for the "low speed" or "intermediate speed" with the check valve V3 opening the oil passage, the front wheel control valve V1 is switched as interlocked to a steering operation exceeding the predetermined angle of the front wheels 8, to supply the pressure oil to the shift clutch 25. Then, the front wheels 8 are driven in acceleration for the tractor to make a smooth, small turn. When the auxiliary change speed gear mechanism 19 is shifted for "high speed" even though the automatic change speed "on" position is selected for the automatic change speed selector valve V2, the automatic front wheel acceleration is not carried out irrespective of a steering operation exceeding the predetermined angle of the front wheels 8. When the automatic change speed "off" position is selected for the automatic change speed selector valve V2 to close the oil passage, naturally the automatic front wheel acceleration never takes place in response to a front wheel steering operation.

A PTO transmission system will be described next.

The rear end of the input shaft 13 extending through and supported by the upper position of the main transmission 12 is aligned with a PTO transmission shaft 35 extending through and supported by the intermediate partition wall 3a. A PTO clutch C3 of the hydraulically operable multi-disk type is interposed between the input shaft 13 and PTO transmission shaft 35.

Figure 8:
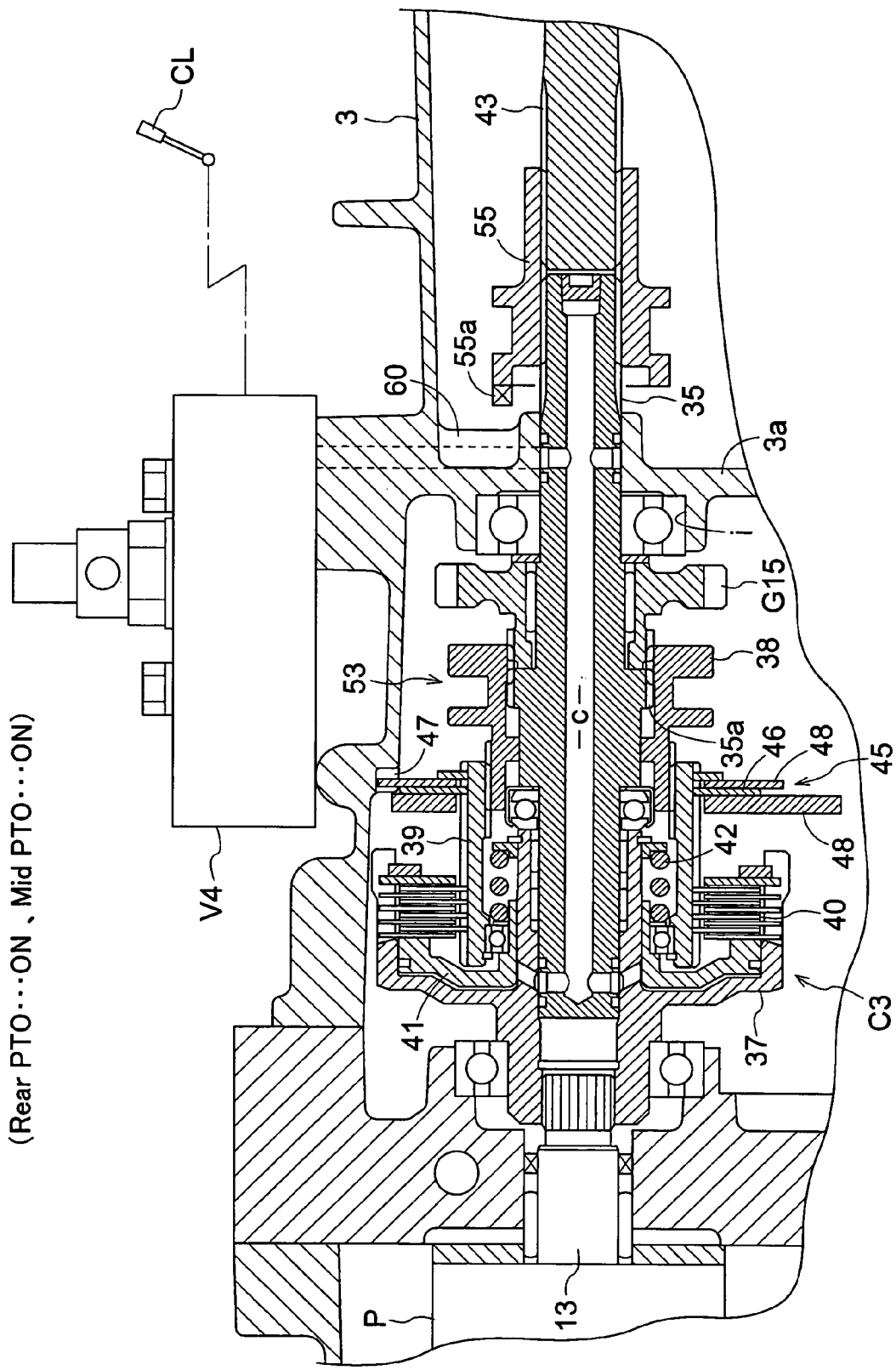
FIG. 8 is a side view in vertical section of a PTO mode selecting device.

As shown in FIG. 8, the PTO clutch C3 includes a clutch drum 37 splined to the rear end of the input shaft 13, a shift member 38 shiftably splined to the PTO transmission shaft 35, a clutch sleeve 39 shiftably splined to the shift member 38, a friction transmission portion 40 of the multi-disk type interposed between the clutch drum 37 and clutch sleeve 39, a clutch-operating piston member 41 contained in the clutch drum 37, and an inner spring 42 for biasing the piston member 41 in a friction release direction. Pressure oil is supplied through an oil passage "c" formed in the PTO transmission shaft 35 to displace the piston member 41 against the force of spring 42 rightward in FIG. 8. This places the friction transmission portion 40 in a pressure contact state, and thus a "clutch on" state. When the pressure oil supply is stopped, the piston member 41 is displaced by the sprint 42 leftward in FIG. 8. This releases the friction transmission portion 40 from the pressure contact state, and thus a "clutch off" state.

A switching valve V4 for PTO clutch operation is connected to the upper surface of the transmission case 3 for applying and stopping a control pressure to the oil passage "c" in the PTO transmission shaft 35. The switching valve V4 is operable by a PTO clutch lever CL disposed, to be pivotable fore and aft, at a left side of a driver's seat 61.

Figure 13:
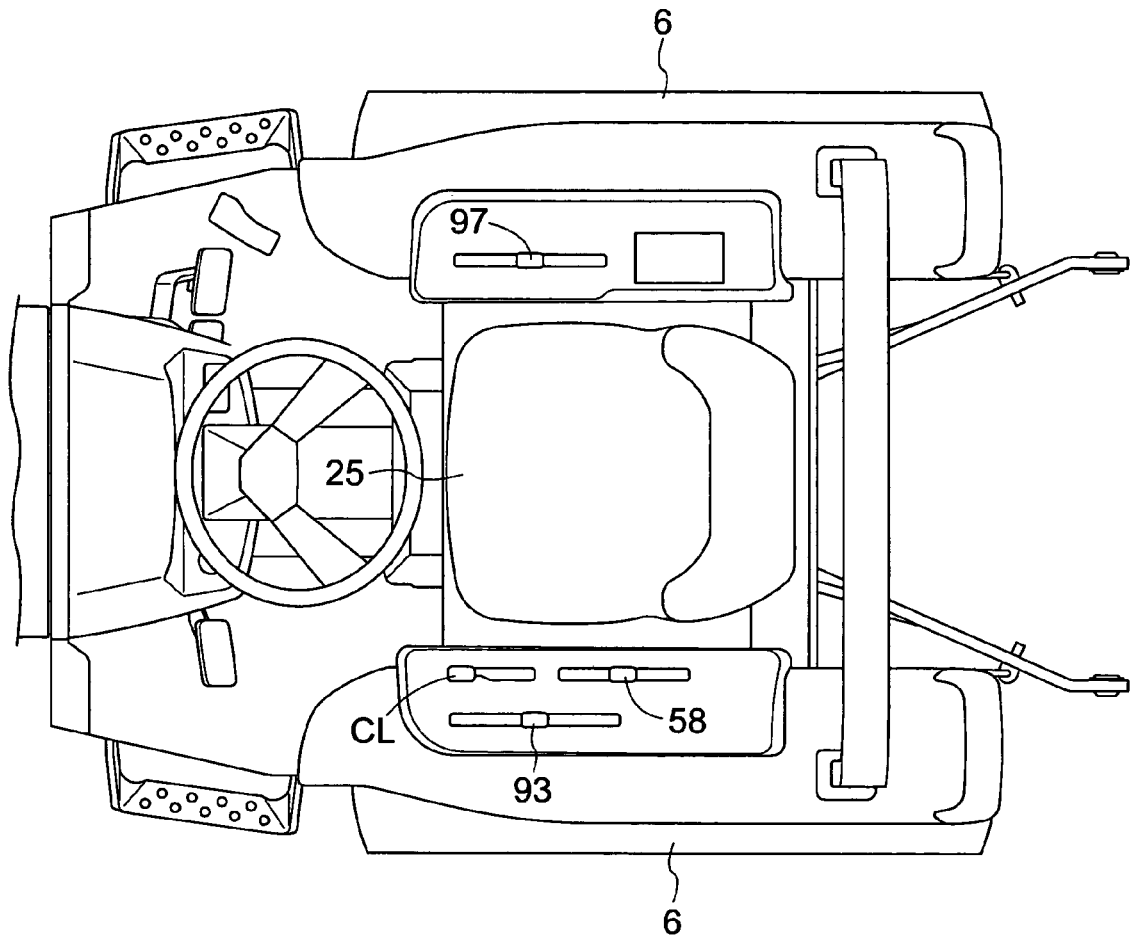
FIG. 13 is a plan view of a rear portion of a vehicle body.
Figure 14:
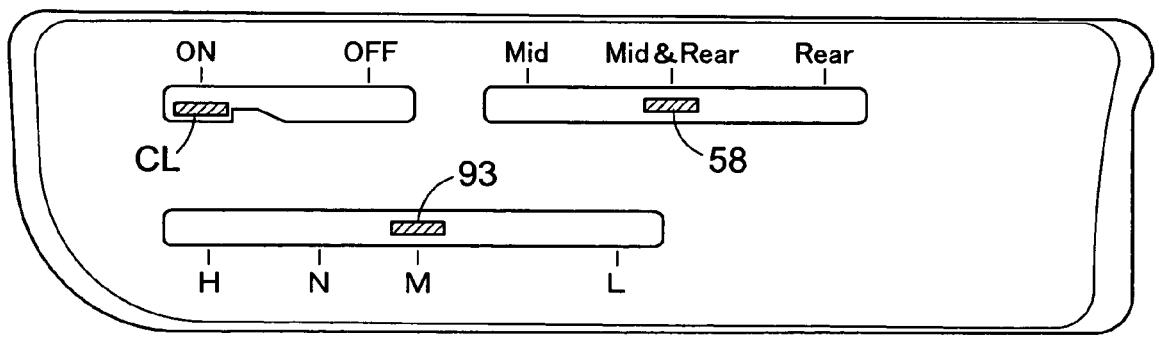
FIG. 14 is a plan view of a lever guide.

As shown in FIGS. 13 and 14, the PTO clutch lever CL has an operating path defining a "clutch on" position in a rearward region thereof, and a "clutch off" position in a forward region. When a "clutch on" state is selected, power transmitted to the clutch sleeve 39 is transmitted to the PTO transmission shaft 35 through the shift member 38, and transmitted to a position rearward of the differential case 5 through an intermediate transmission shaft 43 connected coaxially to the rear end of the PTO transmission shaft 35. The power is greatly decelerated by gears G13 and G14 arranged rearwardly of the differential case 5, to be outputted from the rear PTO shaft 7.

A PTO brake mechanism 45 is disposed rearwardly of the PTO clutch C3, which is interlocked to the "clutch off" operation to stop inertial rotation of the downstream transmission elements. The PTO brake mechanism 45 includes a friction plate 46 splined to the clutch sleeve 39, a seat member 47 fixed to an inner wall of the transmission case 3, and a braking plate 48 unrotatably supported inside the transmission case 3. When the PTO clutch C3 is disengaged to have the piston member 41 moved leftward in the drawings by the biasing force of inner spring 42, the clutch sleeve 39 moves in the same direction with the piston member 41. Then, the friction plate 46 is pinched between the seat member 47 and braking plate 48 to brake the clutch sleeve 39.

As shown in FIG. 3, the transmission case 3 has a mid-PTO case 51 connected to an undersurface thereof forwardly of the intermediate partition wall 3a. The mid-PTO case 51 supports a mid-PTO shaft 50 projecting forward therefrom. The front portion forward of the intermediate partition wall 3a of the transmission case 3 houses a mid-PTO transmission mechanism 52 for gear-interlocking the PTO transmission system and the mid-PTO shaft 50, and a PTO mode selecting device 53 for switching between states of power takeoff from the rear PTO shaft 7 and from the mid-PTO shaft 50.

The mid-PTO transmission mechanism 52 includes a power takeoff gear G15 loosely fitted on a rear portion of the PTO transmission shaft 35, and a gear G16 formed integral with the mid-PTO shaft 50, the gears G15 and G16 being interlocked through relay gears G17, G18 and G19. The relay gear G17 is loosely fitted on the front wheel driving transmission shaft 20. The relay gear G18 is loosely fitted on the propelling transmission shaft 17. The relay gear G19 is loosely fitted on a support shaft 54 mounted on a bottom wall of the transmission case 3.

Figure 9:
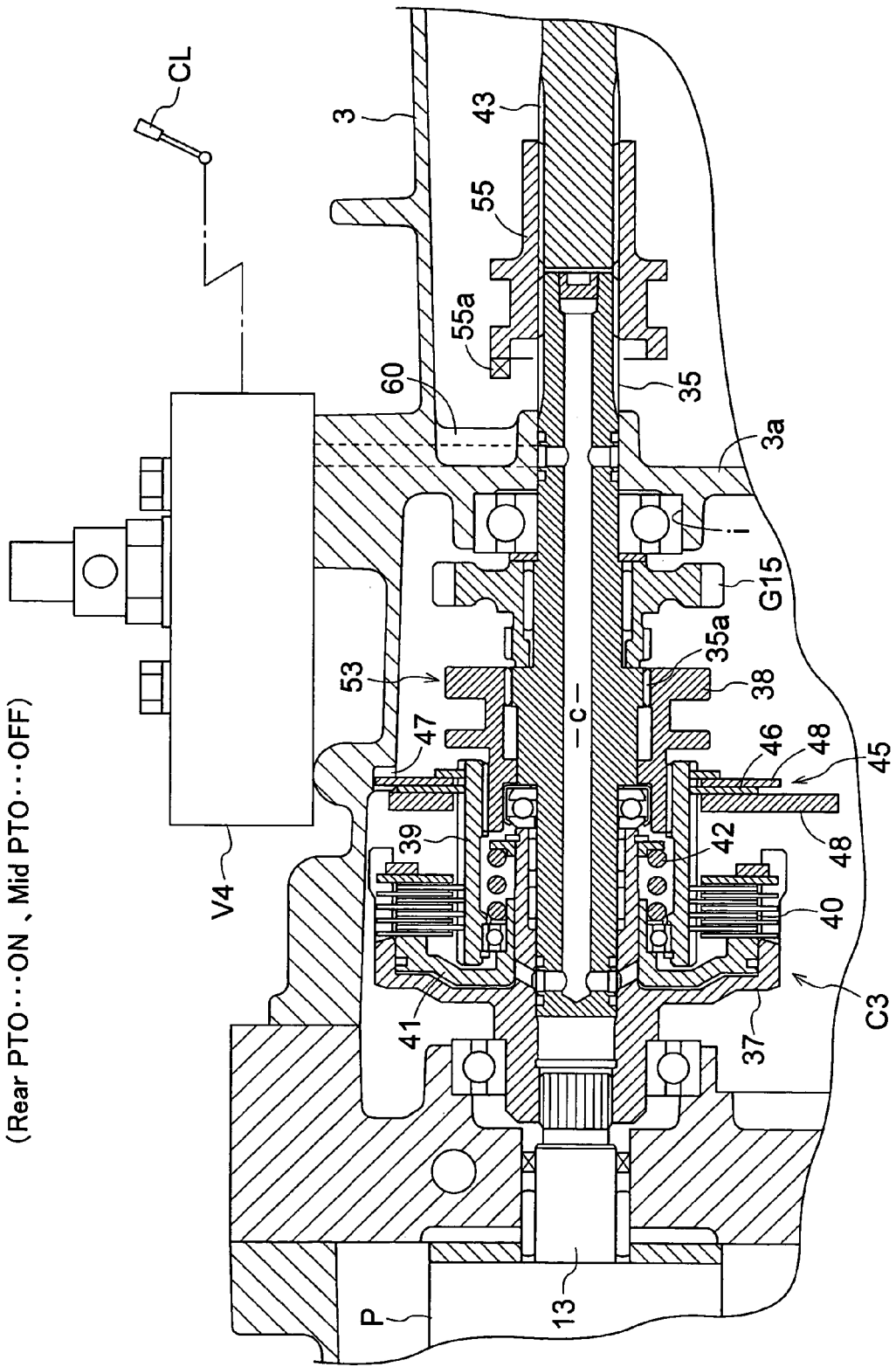
FIG. 9 is a side view in vertical section of the PTO mode selecting device.

The PTO mode selecting device 53 is operable by shifting the shift member 38 forward and backward to select a mode for transmitting power only to the rear PTO shaft 7, a mode for transmitting power to both the rear PTO shaft 7 and mid-PTO shaft 50, or a mode for transmitting power only to the mid-PTO shaft 50. When the shift member 38 is shifted to a foremost position, as shown in FIG. 9, the shift member 38 is meshed only with splines 35a of the PTO transmission shaft 35. Then, the power transmitted to the shift member 38 through the PTO clutch C3 is transmitted only to the rear PTO shaft 7 through the intermediate transmission shaft 43.

When the shift member 38 is shifted to a fore and aft intermediate position, as shown in FIG. 8, the shift member 38 is meshed with the splines 35a of the PTO transmission shaft 35 and splined to a boss of the power takeoff gear G15. Then, the power transmitted to the shift member 38 through the PTO clutch C3 is transmitted to the rear PTO shaft 7 through the intermediate transmission shaft 43, and also to the mid-PTO shaft 50 through the mid-PTO transmission mechanism 52.

Figure 10:
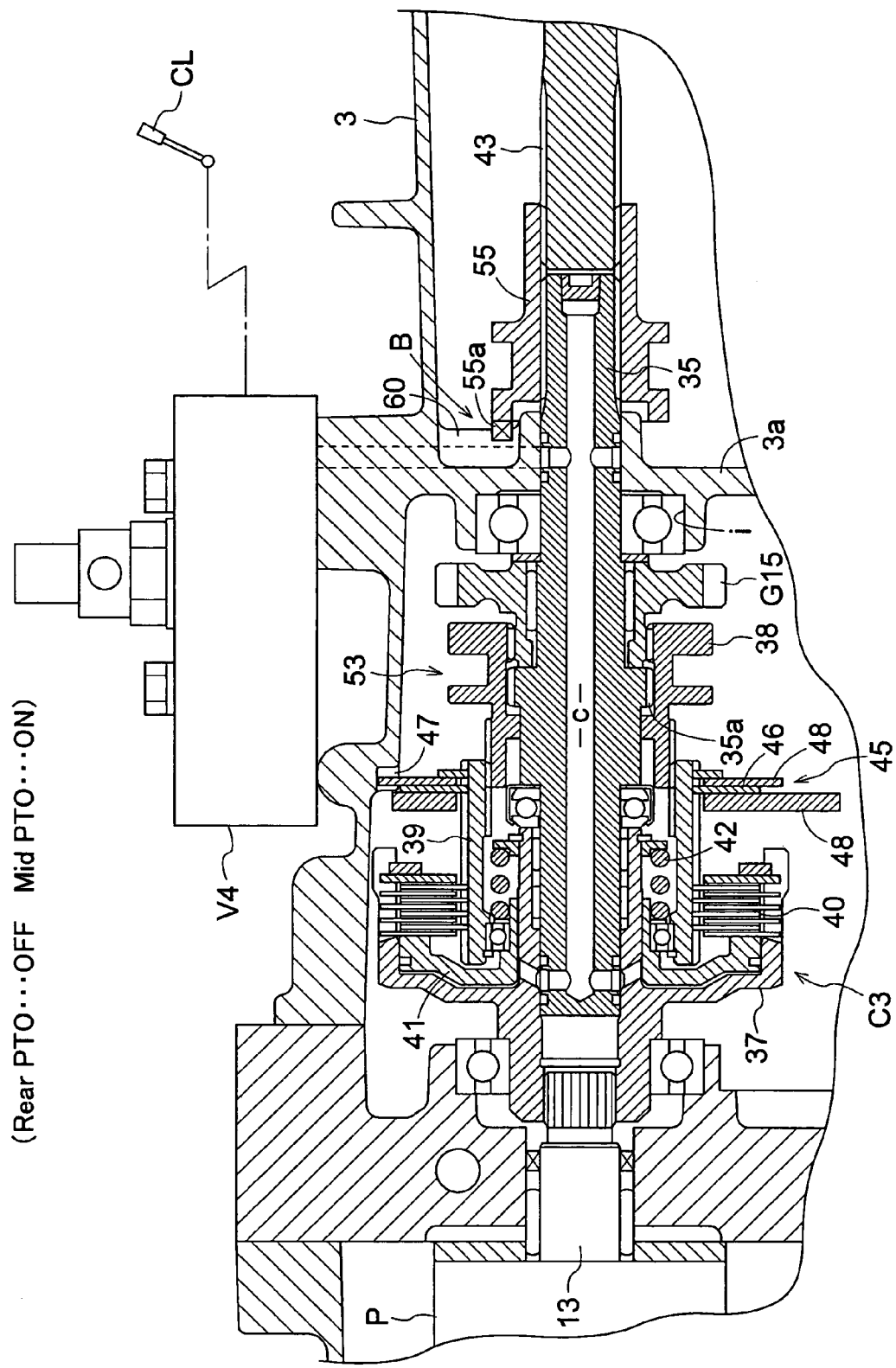
FIG. 10 is a side view in vertical section of the PTO mode selecting device.

When the shift member 38 is shifted to a rearmost position, as shown in FIG. 10, the shift member 38 is splined only to the boss of the power takeoff gear G15. Then, the power transmitted to the shift member 38 through the PTO clutch C3 is transmitted only to the mid-PTO shaft 50 through the mid-PTO transmission mechanism 52.

A shaft coupling sleeve 55 extends between and is splined to the PTO transmission shaft 35 and intermediate transmission shaft 43. When the PTO mode selecting device 53 selects the transmission mode for driving only the mid-PTO shaft 50, the shaft coupling sleeve 55 acts as a PTO brake B for preventing inertial rotation of the rear PTO shaft 7 in free state.

Figure 11:
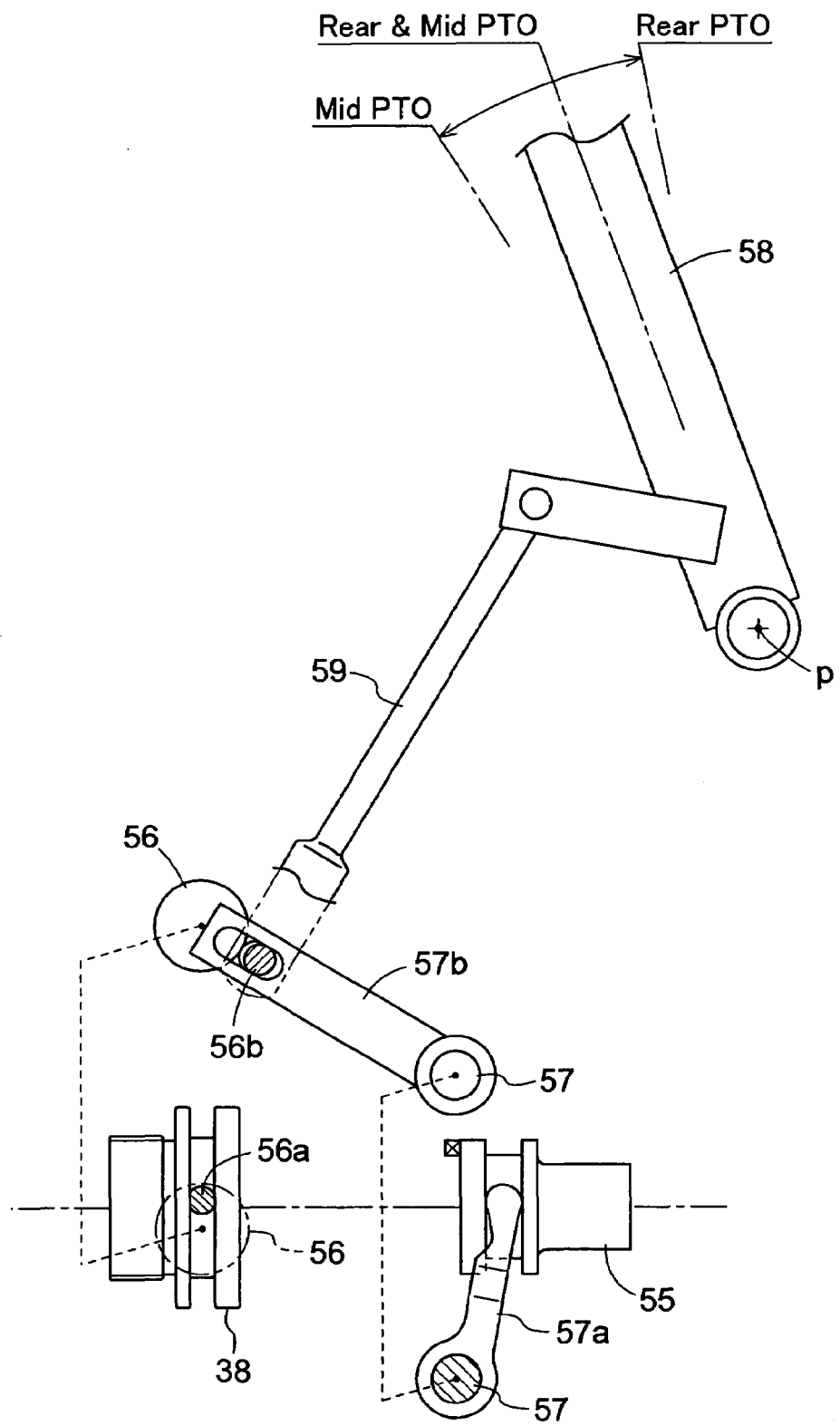
FIG. 11 is a side view showing a control structure for controlling the PTO mode selecting device.
Figure 12:
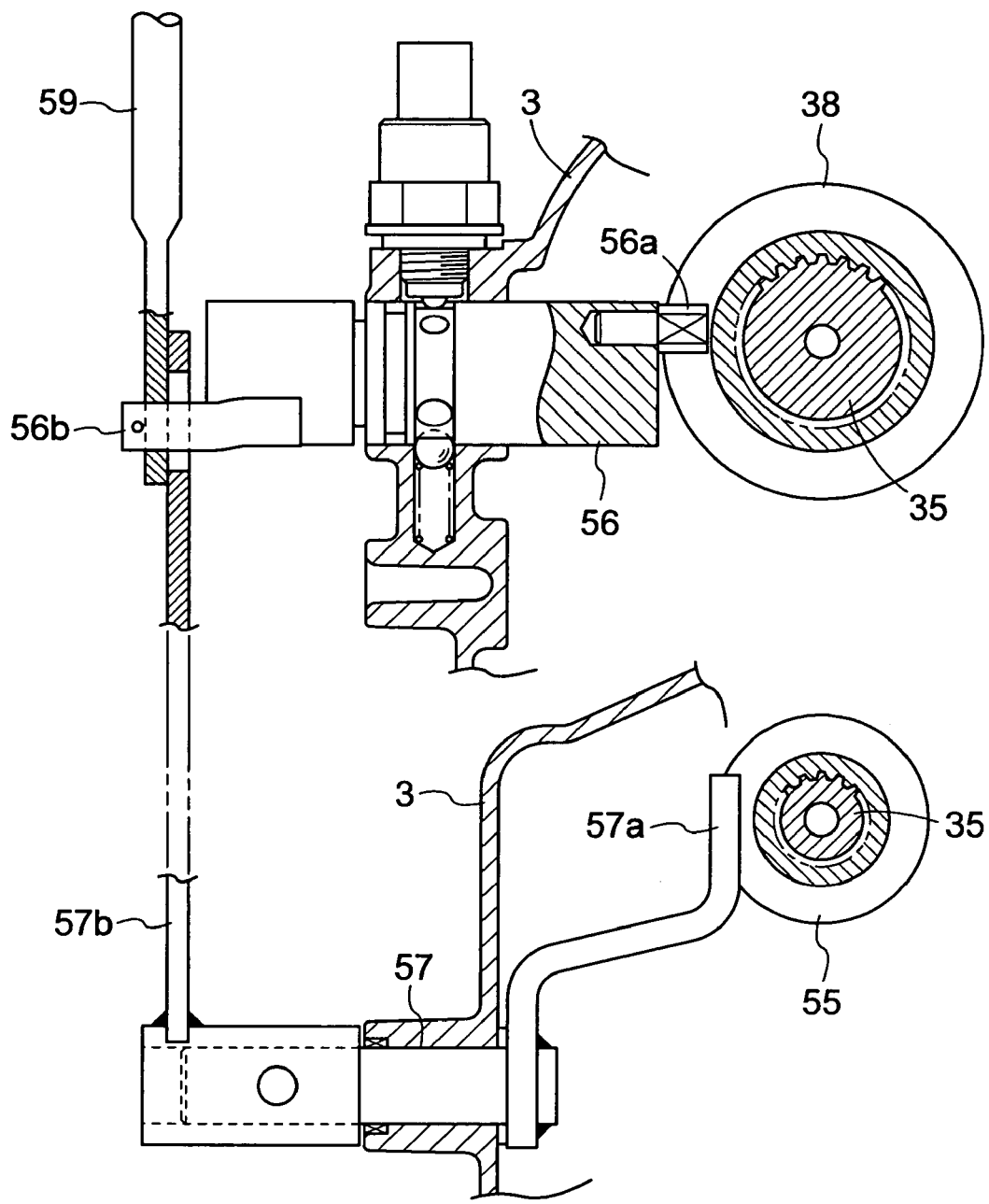
FIG. 12 is a front view showing the control structure for controlling the PTO mode selecting device.

The shaft coupling sleeve 55 is splined to be shiftable back and forth, and has a control system linked so that the shaft coupling sleeve 55 may be shifted in a reverse direction synchronously with the PTO mode selecting shift member 38. Specifically, as shown in FIGS. 11 and 12, a side wall of the transmission case 3 is penetrated by, and supports, a control shaft 56 having an eccentric operating pin 56a for engaging the shift member 38, and a control shaft 57 having a control arm 57a for engaging the shaft coupling sleeve 55. The control shaft 56 has an operating pin 56b disposed at an outer end thereof and interlocked through a rod 59 to a PTO mode select lever 58 pivotable back and forth about an axis "p". The control shaft 57 has a connecting lever 57b extending from an outer end thereof and interlocked by a slot to the operating pin 56b. The shift member 38 and shaft coupling sleeve 55 are shifted in opposite directions to each other by a fore and aft operation of the PTO mode select lever 58.

Thus, when the PTO mode select lever 58 is operated to a rearmost position, the shift member 38 is shifted to the foremost position to select the transmission mode for driving only the rear PTO shaft 7. When the PTO mode select lever 58 is operated to a fore and aft intermediate position, the shift member 38 is shifted to the fore and aft intermediate position to select the transmission mode for driving both the rear PTO shaft 7 and mid-PTO shaft 50. In the above state, the shaft coupling sleeve 55 is in the rearmost position or fore and aft intermediate position in its shifting range. At this time, the shaft coupling sleeve 55 functions as a mere shaft coupling. When the PTO mode select lever 58 is operated to a foremost position, the shift member 38 is shifted to the rearmost position to select the transmission mode for driving only the mid-PTO shaft 50. With the rearward shift of the shift member 38, the shaft coupling sleeve 55 moves forward whereupon an engaging pawl 55a at the forward end of the shaft coupling sleeve 55 engages a rib 60 formed on a rear surface of the intermediate partition wall 3a in the transmission case 3. As a result, the PTO brake B functions to stop rotation of the PTO transmission shaft 35 and intermediate transmission shaft 43 in a state of free rotation.

As shown in FIGS. 13 and 14, the PTO mode select lever 58 is disposed at the left side of the driver's seat 61 to be pivotable back and forth. The PTO mode select lever 58 has an operating path formed directly rearwardly of the operating path of the PTO clutch lever CL. That is, the operating path of the PTO mode select lever 58 is substantially aligned with the operating path of the PTO clutch lever CL. Laterally outwardly of the PTO mode select lever 58 and PTO clutch lever CL, the auxiliary shift lever 93 noted hereinbefore is disposed to be pivotable back and forth.

As shown in FIG. 1, lever lengths are selected so that the PTO clutch lever CL has a grip CLa thereof higher than a grip 58a of the PTO mode select lever 58. Thus, the driver's arm operating the PTO clutch lever CL can easily move clear of the PTO mode select lever 58.

Figure 15:
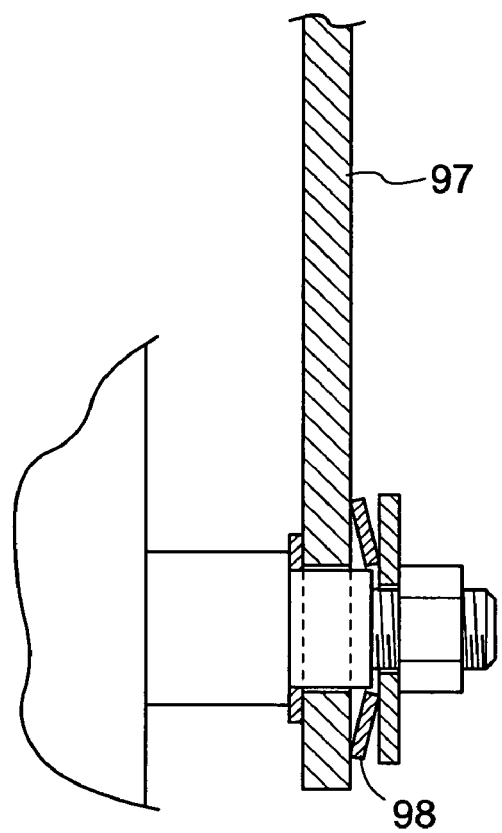
FIG. 15 is a sectional view showing a proximal end of a position control lever.
Figure 16:
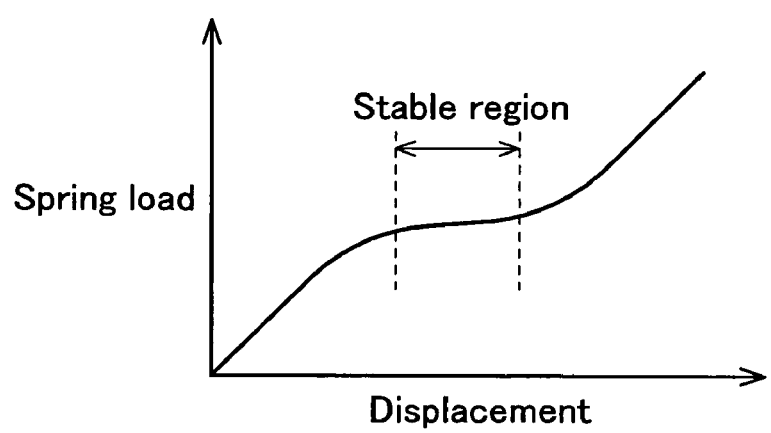
FIG. 16 is a view showing characteristics of a plate spring.

Arranged above and rearwardly of the differential case 5 are lift arms 95 for raising and lowering a working implement, and a lift cylinder 96 for driving the lift arms 95. The lift cylinder 96 is controlled by a position control valve, not shown, linked to a position lever 97 disposed at the right side the driver's seat 61. As shown in FIG. 15, the position lever 97 is retainable in a selected control position by a frictional force of a plate spring 98 provided on a lever fulcrum. Thus, the lift arms 95 may be raised or lowered to and stopped at a height corresponding to a position in which the position lever 97 is retained. The plate spring 98 has a characteristic of spring load in relation to the amount of compression, which, as shown in FIG. 16, includes a spring load stable region in an intermediate part of the deformation range. The plate spring 98 is assembled in this stable spring load condition, so that its frictional retaining function is not seriously affected by minor variations in the amount of compression due to a clamping error occurring in time of assembly.

Figure 18:
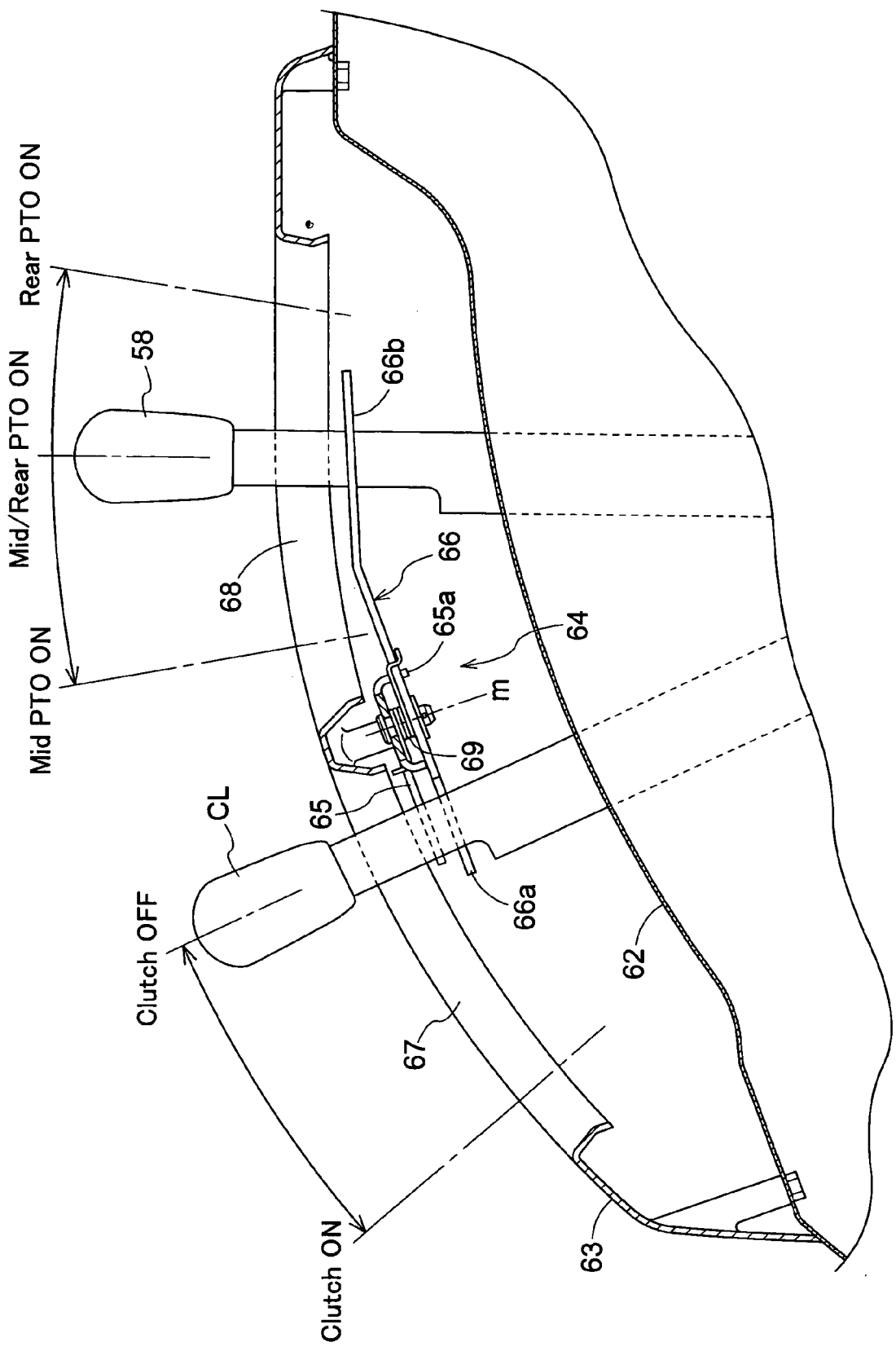
FIG. 18 is a side view showing a lever guide for a PTO system according to this invention.

FIGS. 18, 19(A) and 19(B) show an operating guide for the PTO clutch lever CL that switches the PTO clutch control valve, and for the PTO mode select lever 58.

The PTO clutch lever CL and PTO mode select lever 58 are arranged in fore and aft positions close to each other at the left side of the driver's seat 61. These levers CL and 58 extend through a lever guide 63 attached to a fender 62. The PTO clutch lever CL is mechanically interlocked to the valve V4 through a link mechanism not shown, such that a forward operation of the PTO clutch lever CL provides a "clutch on" state, and a rearward operation thereof provides a "clutch off" state. Further, a restricting device 64 is provided between the PTO clutch lever CL and PTO mode select lever 58 for restricting operation of the PTO mode select lever 58.

Figure 20:
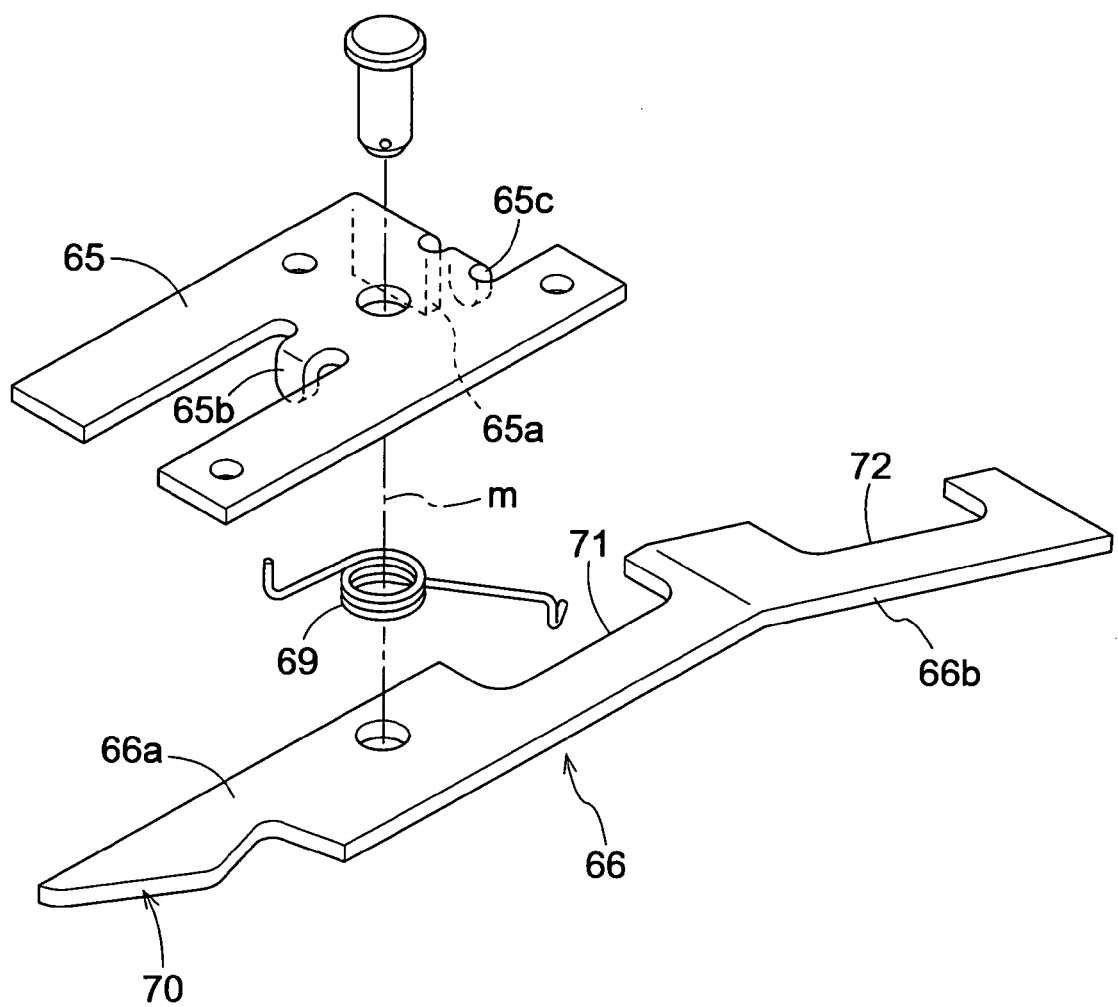
FIG. 20 is a perspective view showing components of a restricting device according to this invention.

The restricting device 64 is disposed adjacent the undersurface of the lever guide 63 and, as shown in FIG. 20, includes a bracket 65 mounted inside the lever guide 63 and fixedly screwed thereto from below, and an elongate restricting element 66, which is an example of restricting member, pivotally supported by the bracket 65 to be swingable about a vertical fulcrum "m". The fulcrum "m" is located in an intermediate position between a guide groove 67 of the PTO clutch lever CL and a guide groove 68 of the PTO mode select lever 58. The restricting element 66 has a control portion 66a extending forward from the fulcrum "m", and a restricting portion 66b extending rearward from the fulcrum "m". Further, the restricting element 66 is biased to swing in one direction (i.e. counterclockwise in FIG. 19) by a torsion spring 69 mounted on the fulcrum "m".

The control portion 66a of the restricting element 66 overlaps a clutch-off region of the guide groove 67 of the PTO clutch lever CL, and has an inclined cam 70 formed on a side edge thereof for contacting and cooperating with the PTO clutch lever CL operated to the "clutch off" position. The restricting portion 66b of the restricting element 66 is formed to have a length for overlapping a "mid-PTO drive" position and a "mid-/rear PTO drive" position in the guide groove 68 of the PTO mode select lever 58. The restricting portion 66b has, formed along a side edge thereof, a recess 71 for receiving and retaining the PTO mode select lever 58 in the "mid-PTO drive" position, and a recess 72 for receiving and retaining the PTO mode select lever 58 in the "mid-/rear PTO drive" position.

With the above restricting device 64, when the PTO clutch lever CL is operated to the forward "clutch on" position, as shown in FIG. 19 (B), the restricting element 66 is in a free state and is swung by the biasing force into contact with a stopper 65a bent from the bracket 65, to be retained in a fore and aft posture. At this time, the restricting portion 66b of the restricting element 66 overlaps the guide groove 68 of the PTO mode select lever 58. The PTO mode select lever 58 in the "mid-PTO drive" position or "mid-/rear PTO drive" position is located in the recess 71 or recess 72, to be inoperable to different positions. The PTO mode select lever 58 in the "rear PTO drive" position is prevented from operating forward by the rear end of the restricting element 66.

When the PTO clutch lever CL is operated to the rearward "clutch off" position, as shown in FIG. 19(A), the inclined cam 70 on the control portion 66a of the restricting element 66 is contacted and pressed by the PTO clutch lever CL, whereby the restricting element 66 is forcibly swung clockwise against the force of torsion spring 69. As a result, the restricting portion 66b is retracted leftward from the guide groove 68. The PTO mode select lever 58 can now be operated backward or forward as desired.

The restricting element 66 of the restricting device 64 is formed of a glossy metal plate material (e.g. plated sheet steel or stainless steel plate) to be clearly visible through the guide grooves 67 and 68. Thus, the operator can easily make a visual or auditory recognition of a functional state of the restricting device 64 by a position of the restricting element 66, or by a metallic sound produced in time of restricting operation. Consequently, when a selecting operation by the PTO mode select lever 58 becomes impossible, the operator is unlikely to operate the select lever 58 forcibly, thereby to damage the restricting device 64 or bend the PTO mode select lever 58.

The bracket 65 has guide pieces 65b and 65c bent to project downward from positions forwardly and rearwardly of the fulcrum "m". These guide pieces 65b and 65c have lower ends thereof shaped to make a sliding contact with the upper surface of the restricting element 66, thereby to guide the latter to be retained stably in place.

Figure 17:
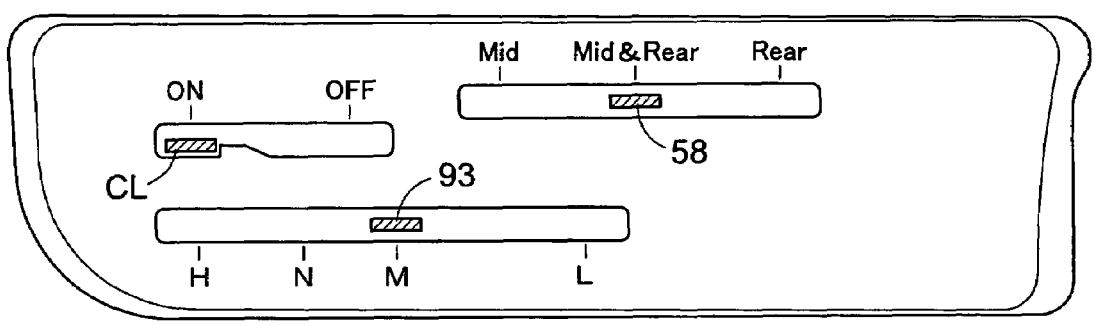
FIG. 17 is a plan view showing a lever guide in another embodiment.

Other Embodiments (1) Where there is an allowance of space laterally of the driver's seat 61, as shown in FIG. 17, the operating paths of the PTO clutch lever CL and PTO mode select lever 58 may be arranged in fore and aft positions slightly staggered transversely from each other. The PTO clutch lever CL and PTO mode select lever 58 may be arranged at the right side of the driver's seat 61.

(2) The PTO clutch C3 is not limited to the hydraulically operable multidisk clutch, but may be a manually operable multidisk clutch or a claw clutch.

(3) The restricting device 64 may be provided between the link mechanism interlocking the PTO clutch lever CL and valve V4, and the switching link mechanism of the PTO mode select lever 58.

(4) The restricting device 64 may be constructed electrically operable. For example, the control positions of the PTO clutch lever CL are electrically detected with a switch or the like. A lock member is provided to act on an appropriate part of the PTO mode select lever 58 or its control link mechanism. Upon detection of the PTO clutch lever CL in the "clutch on" position, the lock member is held in a lever locking position by means of a spring or the like. Upon detection of the PTO clutch lever CL in the "clutch off" position, a potential solenoid is operated to switch the lock member to a lock releasing position.

What is claimed is:

1. A tractor with a PTO apparatus, comprising:
   a plurality of wheels;
   a vehicle body supported by said plurality of wheels;
   an engine supported on said vehicle body;
   a rear PTO shaft disposed at a rear of said vehicle body for transmitting power from said engine;
   a mid-PTO shaft disposed under said vehicle body for transmitting power from said engine;
   a PTO mode selecting device having a first position for transmitting power only to said rear PTO shaft, a second position for transmitting power to both said rear PTO shaft and said mid-PTO shaft, and a third position for transmitting power only to said mid-PTO shaft;
   a PTO clutch disposed on a transmission line upstream of said PTO mode selecting device and switchable between an engaged position and a disengaged position; and
   a restricting mechanism for preventing a change operation of said PTO mode selecting device when said PTO clutch is in the engaged position, and permitting the change operation of said PTO mode selecting device when said PTO clutch is in the disengaged position.

2. A tractor as defined in claim 1, wherein said restricting mechanism is disposed in a position overlapping a region of a PTO clutch lever for operating said PTO clutch, and a region of a PTO mode select lever for operating said PTO mode selecting device.

3. A tractor as defined in claim 2, wherein said restricting mechanism includes a bracket disposed under a lever guide for said PTO clutch lever and said PTO mode select lever, and a restricting member swingably attached to said bracket for contacting at least said PTO mode select lever to restrict movement of said PTO mode select lever.

4. A tractor as defined in claim 3, wherein said restricting member includes a cam portion contactable by said PTO clutch lever, said PTO clutch lever contacting said cam portion when moved to a clutch disengaging position, whereby said restricting member swings relative to said bracket to move to a position away from a moving path of said PTO mode select lever.

5. A tractor as defined in claim 1, further comprising a PTO mode select lever pivotable for operating said PTO mode selecting device, and a PTO clutch lever pivotable for engaging and disengaging said PTO clutch, said PTO mode select lever and said PTO clutch lever being aligned longitudinally with respect to said tractor and being positioned laterally of a driver's seat, and having respective operating paths substantially aligned with each other.

6. A tractor as defined in claim 5, wherein said PTO clutch lever is disposed forwardly of said PTO mode select lever with respect to said tractor.

7. A tractor as defined in claim 6, wherein the operating path of said PTO mode select lever includes a rear end control position for outputting power only from said rear PTO shaft, a fore and aft intermediate control position for outputting power from both said rear PTO shaft and said mid-PTO shaft, and a forward end control position for outputting power only from said mid-PTO shaft.

8. A tractor with a PTO apparatus, comprising:
a plurality of wheels;
a vehicle body supported by said plurality of wheels;
an engine supported on said vehicle body;
a rear PTO shaft disposed at a rear of said vehicle body for transmitting power from said engine;
a mid-PTO shaft disposed under said vehicle body for transmitting power from said engine;
a PTO mode selecting device having a first position for transmitting power only to said rear PTO shaft, a second position for transmitting power to both said rear PTO shaft and said mid-PTO shaft, and a third position for transmitting power only to said mid-PTO shaft;
a mode select lever for operating said PTO mode selecting device;
a PTO clutch disposed on a transmission line upstream of said PTO mode selecting device and switchable between an engaged position and a disengaged position;
a clutch lever connected to said PTO clutch for operating said PTO clutch, said clutch lever being movable between a first lever position corresponding to said engaged position and a second lever position corresponding to said disengaged position; and
a restricting member for contacting and preventing movement of said mode select lever when said clutch lever is in said first lever position, and permitting said mode select lever to operate said PTO mode selecting device, by moving to a position away from a moving path of said mode select lever, when said clutch lever is in said second lever position.

9. A tractor as defined in claim 8, wherein said restricting member is swingably attached to a bracket disposed under a lever guide for said clutch lever and said mode select lever.

10. A tractor as defined in claim 9, wherein said restricting member includes a cam portion contactable by said clutch lever, said clutch lever contacting said cam portion when moved to said second lever position, whereby said restricting member swings relative to said bracket to move to a position away from a moving path of said mode select lever.

11. A tractor as defined in claim 1, wherein, when said PTO mode selecting device is disposed between two adjacent positions, said restricting mechanism is adapted to allow said PTO clutch to move to said engaged position.

12. A tractor as defined in claim 8, wherein, also when said PTO mode selecting device is disposed between two adjacent positions, said restricting member is adapted to allow said PTO clutch to move to said engaged position.

* * * * *